Feb. 3, 1970 J. P. BEVERLY 3,493,909

MINIATURIZED INDUCTIVE COMPONENT

Filed Oct. 4, 1968 5 Sheets-Sheet 1

INVENTOR.
JOHN P. BEVERLY

BY

Bean, Brooks, Buckley & Bean
ATTORNEYS

INVENTOR.
JOHN P. BEVERLY
BY
Bean, Brooke, Buckley & Bean
ATTORNEYS

Feb. 3, 1970 J. P. BEVERLY 3,493,909

MINIATURIZED INDUCTIVE COMPONENT

Filed Oct. 4, 1968 5 Sheets-Sheet 3

INVENTOR.
JOHN P. BEVERLY

BY

Bean, Brooke, Buckley & Bean
ATTORNEYS

INVENTOR.
JOHN P. BEVERLY
BY
Bean, Brooks, Buckley & Bean
ATTORNEYS

INVENTOR
JOHN P. BEVERLY
BY
Bean & Bean
ATTORNEYS

United States Patent Office 3,493,909
Patented Feb. 3, 1970

3,493,909

MINIATURIZED INDUCTIVE COMPONENT

John P. Beverly, 30 Summerdale Drive, East Aurora, N.Y. 14052

Continuation-in-part of application Ser. No. 579,710, Sept. 15, 1966. This application Oct. 4, 1968, Ser. No. 798,501
Int. Cl. H01f 17/06, 17/04, 27/24
U.S. Cl. 336—178 6 Claims

ABSTRACT OF THE DISCLOSURE

A miniaturized inductive component in which the winding is wound upon a single piece core by ordinary and conventional winding equipment. The shape of the core is such as to provide a series air gap and the dimensions of the core are such as to provide low values of total reluctance and flux density and high values of effective permeability. The configuration also lends itself to adjustment of total inductance subsequent to manufacture of the component.

CROSS REFERENCE TO RELATED APPLICATION

This application is a continuation-in-part of my copending application Ser. No. 579,710, filed Sept. 15, 1966, now abandoned.

BACKGROUND OF THE INVENTION

The physical size limitations involved in miniaturized inductive components introduces an additional problem in an already involved situation. Even without the size limitation factor, certain of the characteristics sought are of conflicting nature, tending to be mutually exclusive or antagonistic to each other.

For example, to attain a desired value of total inductance requires a certain finite number of winding turns, but the desirable attribute of low DC and AC resistance requires that the physical size of the conductor (consequently the number of winding turns) be kept to a minimum by the use of a paramagnetic core with the core containing the magnetic circuit produced by the winding. Considering only the characteristic of low AC and DC resistance, the core material would possess the highest possible value of permeability so that the number of winding turns, to produce the desired inductance, would be minimized. The core would then possess the highest value of "effective permeability" possible, effective permeability being defined as the ratio between the inductance produced by the winding with the core in place and the inductance produced by the winding in air (core removed).

The use of high permeability materials conflicts with the desirable characteristics of high Q value and of electrical stability. To take these characteristics in turn, Q value depends upon core losses due to flux density level, copper losses and eddy current losses, and all of these losses bear a relationship to the permeability of the core material and increase therewith.

"Electrical stability" as used herein refers to the ability of the inductive component to retain a fixed value of total inductance under the operating characteristics of DC bias current and AC signal voltage applied during its operation and under the conditions of temperature variation incidental to its use. Broadly stated, electrical stability is deleteriously affected in direct relation to the permeability value of the core material used.

It will be appreciated, then, that the construction of inductive components is at best a compromise and when the additional factor of miniaturization has to be considered, with its concomitant physical size limitation, the situation is complicated further. As a result, the prior art inductive components of small size have gravitated to the use of one of three basic types of core configurations, each having certain advantages and disadvantages and all of which have proven to afford reasonable compromise among the conflicting characteristics noted above. These three core configurations are the toroidal type, the rod or bobbin type, and the pot core type.

Toroidal inductive components involve the use of an annulus or toroid core of paramagnetic material, either ferrite or powdered iron or laminated iron, with the winding wrapped around the material of the toroid to form an annular or toroidal component having an overall diameter approximately equal to the outside diameter of the toroidal core plus twice the diameter of the winding wire and a thickness approximately equal to the thickness of the toroid plus twice the diameter of the winding core wire. For miniaturization, the core is made as small as possible so that the total number of winding turns required occupy the entire circumferential length of the core.

The rod or bobbin type involves a rod of paramagnetic material upon a central portion of which the winding is placed, or the length of the rod receiving the winding may be of a reduced diameter so that the diameters of the end portions and the winding portion are substantially the same. In these configurations, the length of the rod or bobbin usually is about four times its diameter and the length of the winding typically may be in the order of one half the length of the core.

Pot type components involve the use of a two piece core, together forming a cylinder having annular hollow interior provided by a central post or spool, the winding is wound upon a suitable form which is then inserted in place as a unit to reside in the aforementioned hollow interior. Patent 2,064,771 is an example of a pot type inductive component.

As has been mentioned, these three types have been found to allow sufficient compromise as between the conflicting requirements to produce inductive components exhibiting acceptable characteristics.

The chief advantage of the toroidal components is their capability of producing high effective permeability, they exhibit good electromagnetic shielding (magnetic field does not extent appreciably beyond the physical confines of the component), but electrical stability is poor. In miniaturized units, the core efficiency or Q value is low under normal conditions of operating voltage because of the high flux density in typical applications. The physical process of winding the component is at best difficult, requiring special winding equipment.

Rod and bobbin types are capable of miniaturization also and they inherently possess good electrical stability and Q value, but their electromagnetic shielding and effective permeability are poor. A significant advantage, however, is the ease of winding inherent with this type of component.

Pot type components are, first of all, of bulky design and are not capable of being produced in such small sizes as comes within the definition of miniaturization as used herein. They are also expensive for the reason that the paramagnetic core is of two piece configuration and requires careful machining if the parts are to match properly. Further, the design requires a third part, the form upon which the winding is placed. Also, assembly and fabrication problems tend to be troublesome. These factors aside, however, cup type components possess very good effective permeability, are well shielded electromagnetically, are easily wound, and may be designed to possess good Q values.

BRIEF SUMMARY OF THE INVENTION

In the background of the invention, the general problem of conflicting or antagonistic requirements has been generally and loosely stated without regard to delving too deeply into the technical aspects from which these conflicts stem. To summarize the present invention, still without resource to details of the technical considerations, it may be stated that the present invention aims at the provision of a miniaturized inductive component which exhibits high effective permeability, high electrical stability, high Q value and good electromagnetic shielding. In addition, and by no means least important, the components according to the present invention are capable of adjustment of their total inductance value after the winding has been completed. This last factor allows the components to be made to close tolerances of their total inductance value, i.e., they may be adjusted to produce very high precision components.

Briefly stated, the concepts of the present invention are directed primarily to three basic features: (1) the provision, in a miniaturized inductive component, of a paramagnetic core body of one piece construction which involves a maximum cross-sectional area of the core body in that region thereof normal to the magnetic field and contained within the winding which bears a particularized relationship to the maximum area of the component; (2) the provision of a paramagnetic core body, which, with its winding, exhibits a total reluctance $R_t$ which is the sum of the reluctance $R_a$ of the magnetic field in air and the reluctance $R_m$ of the magnetic field in the body, wherein the numerical value of the ratio $R_a/R_t$ is at least about 0.2; and (3) the provision of a core configuration which produces a particular relation between the Q value of the component, the frequency $f$ at which the Q value is measured, and the total reluctance $R_t$.

In this way, the conflicting requirements may be made more compatible so as to produce a miniaturized inductive component whose cumulative properties are superior to those attainable by the prior art and which, at the same time, allows for wide adjustment of its total inductance value subsequent to the manufacture thereof, and is also simple and inexpensive to produce.

BRIEF DESCRIPTION OF THE DRAWING FIGURES

DETAILED DESCRIPTION OF THE INVENTION

Figure 1:
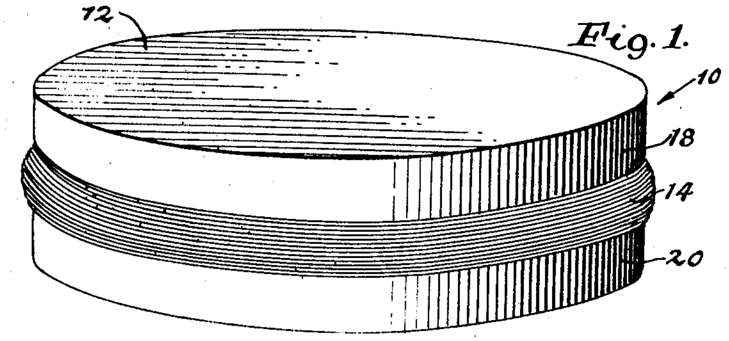
FIG. 1 is a perspective view showing one form of the invention.

Owing to the present state of technology, there is currently a need for miniaturized inductive components. By the term "inductive component" as used herein with reference to the present invention is meant both inductors and transformers and miniaturization is implied, i.e., components displacing a volume not greater than about 0.50 cubic centimeter.

In order better to appreciate the concepts of the present invention, the following characteristics and their conflicts need be considered: (a) effective permeability; (b) electrical stability; and (c) core efficiency.

Insofar as (a) is concerned, the effective permeability of the component is affected by both the geometrical configuration and the permeability $u_m$ of the material used for the core and a high value of effective permeability is required of miniaturized inductive components since the space available for the winding is limited severely. Thus, a high value of inductance per winding turn is required. Since the total inductance L may be expressed as follows:

$$L=K_n^2/R_t$$

where:

K is a constant,
$n$ is the number of winding turns, and
$R_t$ is the total reluctance of the magnetic circuit, it can be seen that to achieve a high value of inductance per turn $L/n=K_n/R_t$, the total reluctance of the magnetic circuit must be low. The total reluctance $$R_t=R_a+R_m$$

where $R_a$ is the reluctance due to that portion of the magnetic circuit which passes through air and $R_m$ is the reluctance due to that portion of the magnetic circuit which passes through the core material. From the consideration of high effective permeability alone, it will be apparent that reduction of both $R_a$ and $R_m$ is desirable. The former may be attained by using a winding-core configuration with no air gap ($R_a=0$) as in a completely wound toroidal core, while the latter is attainable by using a core material of high permeability $u_m$. As will be seen, however, this obvious solution deleteriously affects both the requirements of electrical stability and core efficiency.

Insofar as (b) is concerned, the permeability of the core material is not constant, but varies in relation to AC signal voltage, DC bias current, and operating temperatures. Thus, when the total reluctance $R_t$ of the component is composed wholly or largely of $R_m$, the component will be unstable as regards its value of inductance. In a miniaturized coil, this is usually unavoidably true. In un-miniaturized units, it is not usually true. Thus, for a miniaturized inductive device, a configuration of the component which produces an air gap in the magnetic circuit would appear desirable since the $R_a$ thus present will not vary, the permeability of air being an invariable. This may be appreciated better by considering the following:

$$L=K_n^2/R_t$$

where:

L is the inductance of the component
$n$ is the number of winding turns
$R_t$ is the total reluctance of the magnetic circuit
K is a constant.

In this equation, K and $n$ are fixed for any component and $R_t$ is, as stated before, equal to $R_a+R_m$, where $R_a$ is the reluctance of the magnetic circuit due to air path while $R_m$ is the reluctance due to the path through the magnetic material. For any given component, $R_a$ is fixed (the permeability $u_a$ of air being invariable) but $R_m$ varies inversely with the permeability $u_m$ of the magnetic material. Thus, the stability of L (electrical stability) is dependent upon the ratio $$\frac{R_a}{R_a+R_m}=\frac{R_a}{R_t}$$

By inspection, it will appear that the higher this ratio, the greater will be the electrical stability.

Instability of inductance values may also arise due to core saturation effects. Operation of ferrite material at a flux density B must above 250 gauss and of powdered iron much above 750 gauss adversely affects electrical stability.

Regarding (c), coil efficiency or Q value is dependent to a great degree upon core losses. To achieve high Q the groove or channel. In all such cases, to provide assurance that the resultant magnetic reluctance in air is sufficiently low, the ratio of length to width of the groove must not be less than the specified minimum value of 10/1.

With respect to the overall size of inductive components with which the present invention is concerned, they are of external dimensions to occupy a space not greater than about 0.50 cubic centimeter and a typical groove width is in the order of .010–.040 inch.

Figure 3:
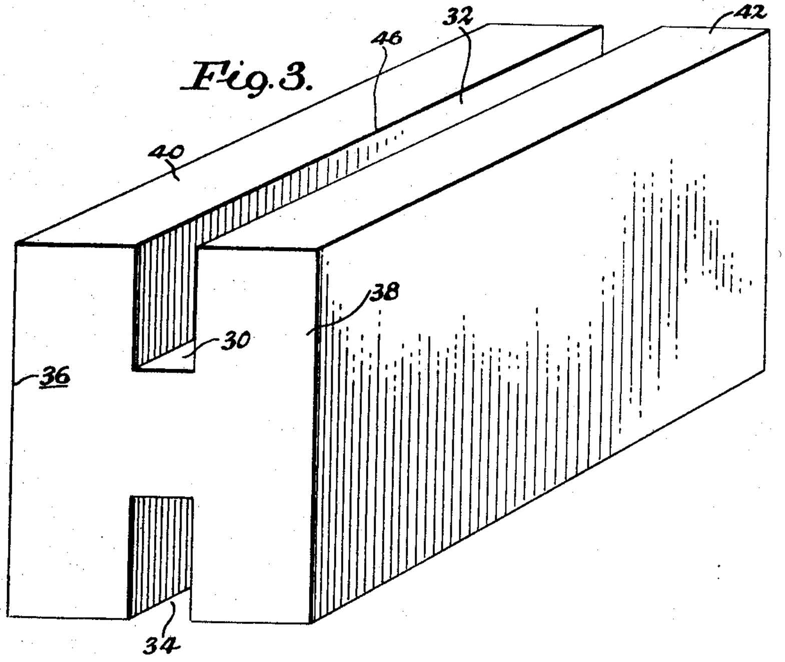
FIG. 3 is a perspective view of a modified form of a paramagnetic body.
Figure 4:
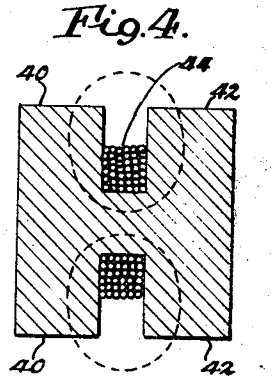
FIG. 4 is a transverse section taken through an inductive component utilizing the body configuration as shown in FIG. 3.

A modified form of the invention is depicted in FIGS. 3 and 4. In FIG. 3, the spool portion of the body is indicated by the reference character 30 and the groove, discontinuous in this case, consists of two portions 32 and 34 provided on opposite sides of the body giving it an H-sectional shape. The pole or flange pieces are indicated by reference characters 36 and 38 and each has oppositely disposed external faces 40 or 42 between which, as before, flux lines of the magnetic field induced by the winding 40 pass through air widthwise of the groove as is shown by dashed lines in FIG. 4.

Figure 5:
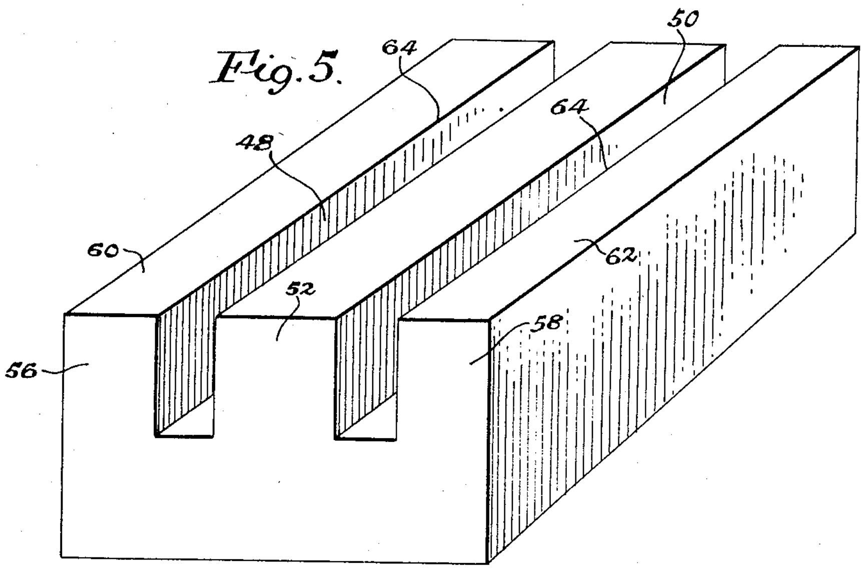
FIG. 5 is a perspective view of a further modified form of a paramagnetic body.
Figure 6:
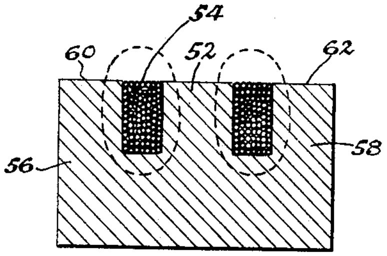
FIG. 6 is a transverse sectional view illustrating an inductive component utilizing the body configuration of FIG. 5.

A still further modified form of the invention is illustrated in FIGS. 5 and 6. As shown in FIG. 5, the groove in the body of paramagnetic material consists of the parallel groove portions 48 and 50 which form, therebetween, the spool portion 52 about which the winding 54 is disposed (FIG. 6). The flange pieces 56 and 58 present the external faces 60 and 62 between which flux lines of the magnetic field extend partly through air widthwise of the groove as is indicated by the dashed lines in FIG. 6.

To illustrate a specific example typifying the concepts according to the present invention and referring to the type of inductive component shown in FIG. 1, the dimensions and characteristics of two specific components are as follows:

Component 1

| | |
|---|---|
| Diameter of body | 0.110 inch. |
| Thickness of body | 0.045 inch. |
| Width of groove | 0.015 inch. |
| Width of faces **18** and **20** | 0.015 inch. |
| Diameter of spool portion **22** | 0.040 inch. |
| Winding wire size | 48 AWG. |
| Number of winding turns | 120. |
| Material of body | Powdered carbonyl C iron. |
| Permeability of body | 25. |
| Q value at frequency | 60 at 2.5 mc. |
| Inductance | 100 microhenries. |

Component 2

| | |
|---|---|
| Diameter of body | 0.200 inch. |
| Thickness of body | 0.045 inch. |
| Width of groove | 0.015 inch. |
| Width of faces **18** and **20** | 0.015 inch. |
| Diameter of spool portion **22** | 0.060 inch. |
| Winding wire size | 48 AWG. |
| Number of winding turns | 250. |
| Material of body | Powdered carbonyl C iron. |
| Permeability of body | 25. |
| Q value at frequency | 41 at 1.75 mc. |
| Inductance | 1000 microhenries. |

Figure 7:
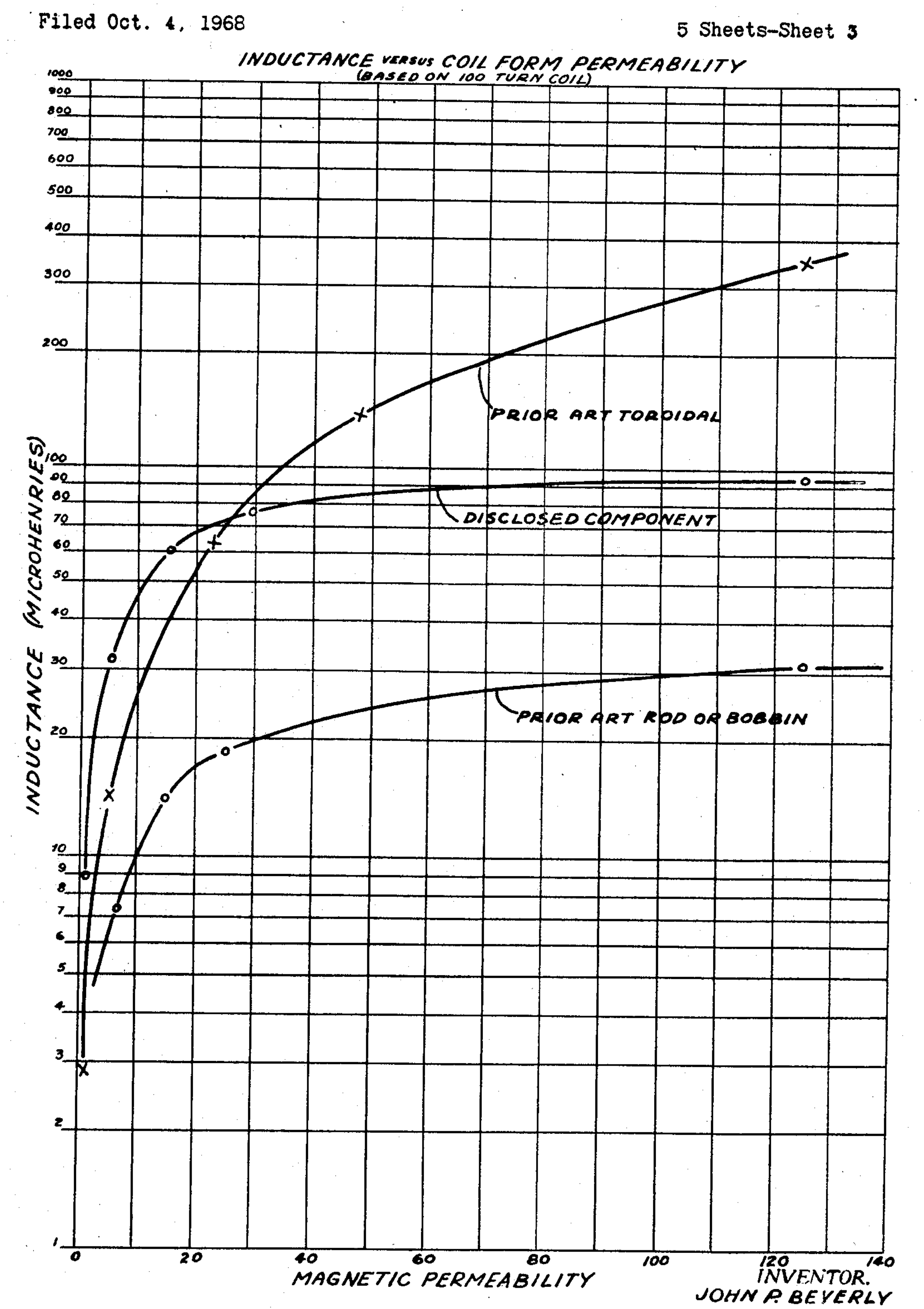
FIGS. 7 and 8 are graphs illustrating certain advantages of the present invention as compared to conventional constructions.
Figure 8:
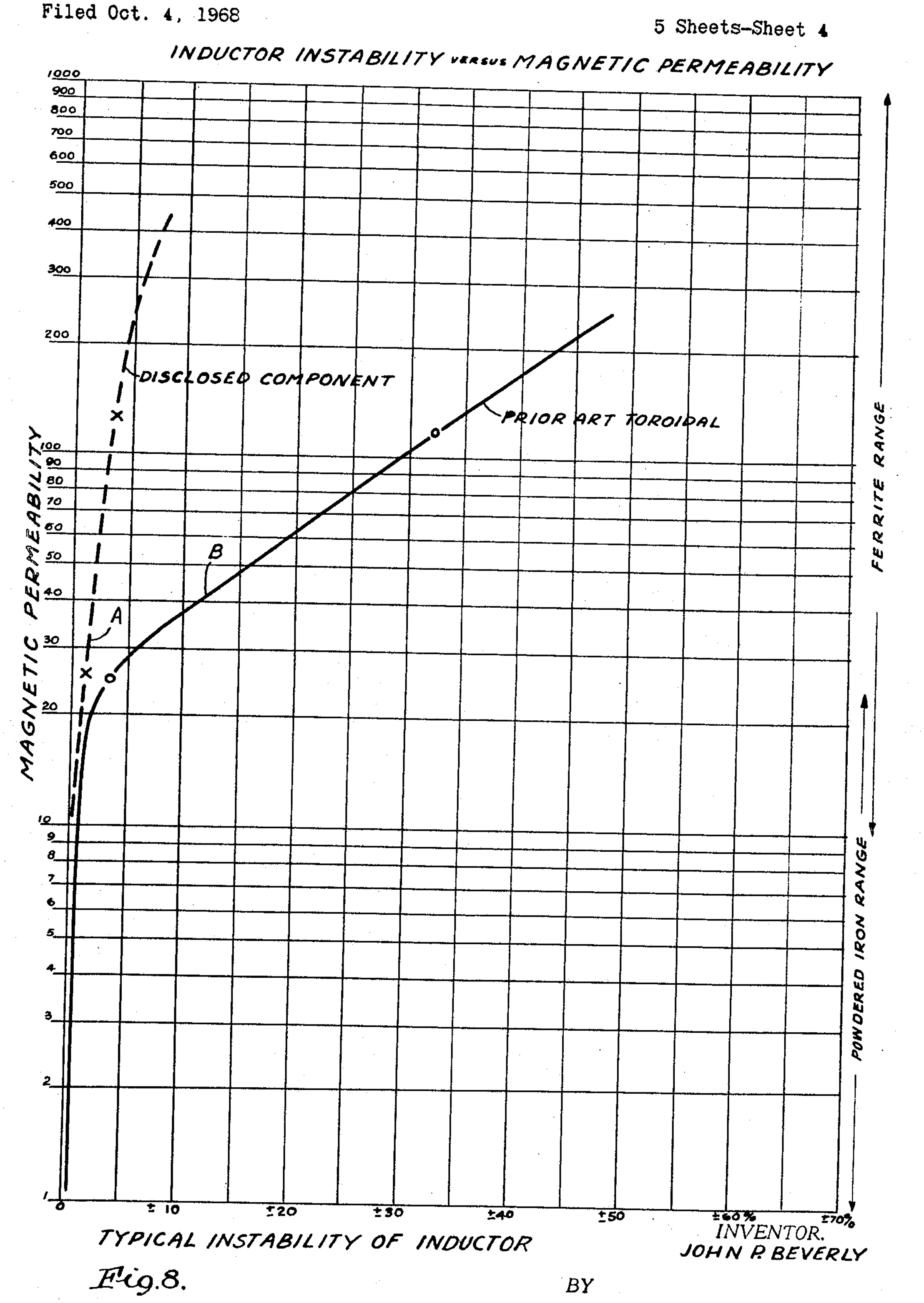

FIG. 7 illustrates typical values of inductance versus coil form permeability for the two prior art configurations discussed in comparison with components according to this invention. This figure clearly shows the inferiority of rod or bobbin type components insofar as inductance per turn is concerned, and further shows the superiority of the present invention with respect to toroidal components up to values of permeability of about 25. As has been previously stated, the maximum inductance values demanded by the trade can be accommodated by miniaturized components of the present invention without resorting to permeability values greater than about 30 whereas this is not true with respect to toroidal components. With the latter, it is often necessary to resort to higher values of permeability in order to retain the component within the realm of size rendering it a truly miniaturized component. Whereas this procedure automatically increases the value of inductance per turn, FIG. 8 illustrates that it also decreases the electrical stability.

As compared with conventional bobbin type inductive components, the inductive components of the present invention exhibit, for all values of permeability of the paramagnetic body, inductances for a given number of winding turns which are substantially greater than the inductances exhibited by equivalent bobbin type components. Moreover, for lower values of magnetic permeability of the body, the present invention achieves greater values of inductance per turn than can be attained by equivalent toroidal inductance components.

Specifically, for values of permeability less than about 30, the present invention achieves greater values of inductance than is possible with an equivalent sized toroidal component of like number of turns. However, in view of the vastly superior stability characteristics of the present invention as compared to toroidal inductance components, the present invention becomes practicable even with materials having very high values of permeability since inductance components of the present invention will exhibit in this range of permeability (i.e., greater than 30) inductances for a given number of turns which, although less than that attained by an equivalent sized toroidal inductive component, are nevertheless substantially greater than the inductances exhibited by an equivalent sized bobbin inductive component while exhibiting the stability characteristics attained by bobbin types. Also essentially the full desired range of inductance can be achieved with the present invention by adjustment of wire size, number of turns, and core size, all while maintaining miniaturization. Thus, the present invention exhibits the ease of fabrication and the stability characteristics of a bobbin type inductive component with the inherent high inductance and electromagnetic shielding of a toroidal type inductive component.

Figure 9:
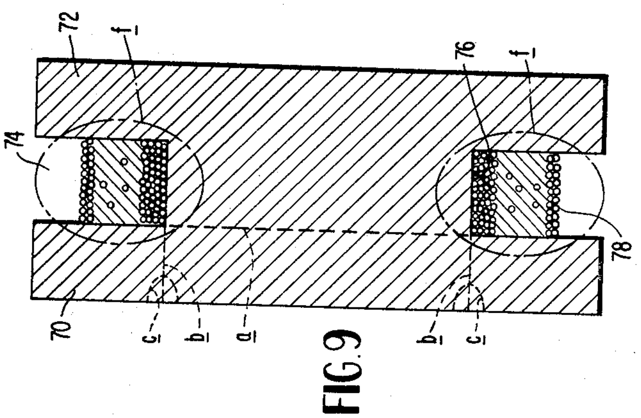
FIG. 9 is a cross-sectional view taken through a typical component and illustrating the manner in which total inductance may be varied subsequent to disposition of the winding turns.

In order to illustrate certain properties of the invention and to demonstrate the manner in which total inductance may be altered conveniently after the component is fabricated, reference is had now to FIG. 9. In FIG. 9, a much enlarged but properly scaled section through a component constructed according to the dimensions set forth hereinabove with regard to "Component 2" is shown. The pole pieces 70 and 72 define the annular groove 74 therebetween and are connected by the spool portion 76. The winding is indicated by reference character 78.

The construction is such that the circular area $A_1$ cut by the dashed-line plane *a* and the annular area $A_2$ cut by the annular plane *b* are closely enough related as to allow the area $A_2$ to be decreased so that the total inductance value of the component may be reduced. For "Component 2," $A_1=.0009\pi$ sq. in.$=A_2$ whereas for "Component 1," $A_1=.0004\pi$ sq. in. and $A_2=.0006\pi$ sq. in. For practical purposes, this means that the density of flux lines *f* cross-sectionally of the spool portion 76 is at least as great as the density of flux lines cross-sectionally of the pole portions 70 and 72 at their roots or bases. The above dimensional characteristics allow for decreasing the total inductance of the component by removing material so as to decrease the area $A_2$. In FIG. 9, this is shown in dashed-lines *c* which illustrate the removal of material by cutting or otherwise providing an annular channel as indicated.

The area $A_2$ also may be decreased simply by decreasing the thickness of one of the pole or flange pieces 70, 72. To illustrate representative values of inductance variavalues, low core losses are required which, in turn, depend upon a low level of magnetic flux density B in the magnetic core material, core losses being proportional to $B^2$. Optimum Q values cannot be obtained at levels of B much above 20 gauss for ferrite material and above 200 gauss for powdered iron. I have found that all of the above requirements may be met by utilizing a core configuration in which the ratio $Am/A$ is at least about .2, where $Am$ is the cross sectional area of the core material spool portion upon which the winding is wound and A is the maximum cross sectional area of the component; and wherein the core configuration is such that part of the magnetic circuit is in air, with $R_a/R_t$ equal to at least about .2 for low permeability materials (i.e., $u_m=10$).

Comparison of the present invention with prior art inductance components will appear from the following table:

the central aperture), and also because the toroidal configuration of the magnetic material is an inefficient geometrical configuration, these prior art components in order to render a total inductance equal to the same size component of this invention, quite often require the use of a paramagnetic body of higher permeability. Thus, in FIG. 8, a component of the present invention might use a body having permeability of say 30, as at point A, whereas a toroidal component of the same size and total inductance might require a body having permeability of 40, as at point B. Thus, the spread in instability will be, in many cases, greater than casual inspection of FIG. 8 might indicate. It will be realized that the points A and B have been arbitrarily selected and that they were chosen solely to indicate the trend rather than to establish absolute values of instability.

As has been stated already, the objects of good stability and high values of inductance per turn with respect to

TABLE I

| Core Configuration | Permeability ($u_m$) | Total Reluctance ($R_t$) (l./cm.) | Calculated Number Turns (n) for 120 μh. | Calculated Typical Flux Level in Gauss O=100 | O=50 | Percent Reluctance in Air Gap, Percent $R_a/R_t$ |
|---|---|---|---|---|---|---|
| This Invention (Am=.0506 cm.$^2$) | 10 | 1.42 | 110 | 10.2 | 5.1 | 19.8 |
| | 15 | 1.04 | 94 | 12.0 | 6.0 | 26.9 |
| | 150 | .36 | 55 | 20.4 | 10.2 | 77.8 |
| | 1,500 | .29 | 50 | 22.4 | 11.2 | 95.9 |
| Toroid (Am=.0078 cm.$^2$) | 10 | 14.8 | 353 | 20.5 | 10.3 | 0 |
| | 15 | 9.9 | 292 | 24.8 | 12.4 | 0 |
| | 150 | 1.0 | 93 | 78.0 | 39.0 | 0 |
| | 1,500 | 0.1 | 29 | 250.0 | 125.0 | 0 |
| Bobbin (Am=.026 cm.$^2$) | 10 | 10.75 | 304 | 7.2 | 3.6 | 72.1 |
| | 15 | 9.75 | 290 | 7.6 | 3.8 | 79.5 |
| | 150 | 7.95 | 262 | 8.4 | 4.2 | 97.5 |
| | 1,500 | 7.77 | 259 | 8.5 | 4.3 | 99.7 |
| Pot Core with Air Gap (Am=.0506 cm.$^2$) | 50 | 1.40 | 105 | 11.2 | 5.6 | 11.4 |
| | 15 | .99 | 87 | 12.9 | 6.5 | 16.2 |
| | 150 | .24 | 32 | 35.2 | 17.6 | 66.7 |
| | 1,500 | .17 | 21 | 53.6 | 26.8 | 94.1 |

With reference now to FIG. 1, the reference character 10 therein indicates in general an inductive component constructed in accordance with this invention which is formed of a body 12 of paramagnetic material and having a winding 14 associated therewith as will be readily understood by those skilled in the art.

Figure 2:
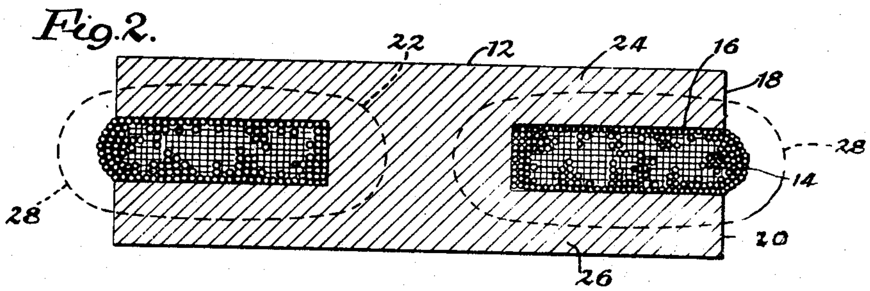
FIG. 2 is a cross-sectional view taken through the assembly shown in FIG. 1.

As is shown more particularly in FIG. 2, the body 12 is provided with a circumferential groove 16 substantially midway within the cylindrical face of the body 12 to present external faces 18 and 20 (see particularly FIG. 1) disposed on opposite sides of such groove. The cavity formed by this groove receives the aforementioned winding 14. In effect, the groove divides the body 12 into a core or spool portion 22 directly upon which the winding 14 is wound and the two pole or flange pieces 24 and 26 which are at opposite sides or ends of the inductive component 10. Because of the disposition of the winding 14, lines of flux of the magnetic field induced by the winding pass partly through the material of the body and partly through air widthwise across the groove 16 and between the faces 18 and 20, two such lines of flux being indicated by the dashed lines as at 28 in FIG. 2.

Because of the air gap in the magnetic path, the inductance of the device is relatively insensitive to temperature changes, changes in A.C. signal voltage and D.C. bias current and to illustrate this relationship in comparison with a conventional type of toroidal core, reference is had to FIG. 8. In this figure, the dashed line curve representing instability values of the inductive components according to the present invention will be seen to be less in all cases than the instability values of prior art toroidal cores as shown by the full line curve in FIG. 8. In considering FIG. 8, it must be realized that because toroidal components employ a body which is wasteful of space (i.e., miniaturized inductive components are antagonistic within the realm of prior art experience whereas the present disclosure successfully establishes compatibility between these objectives. It has been discovered that certain very definite physical relationships need be established in order to successfully construct miniaturized inductive components according to the present invention. First of all, it has been found that in all cases, the groove or groove system within which the winding or windings are disposed must bear at least a certain minimum relationship with respect to the width of the groove or groove system. In particular, the length of the groove or groove system must be at least about 10 times the groove width if the attributes of the present invention are to be obtained.

Another relationship which has been found to exist is that the width of the flange portions of the inductive component must be at least about as wide as the channel or groove and, further, that making them appreciably wider than the channel provides a very limited improvement in function and is generally detrimental owing to the fact that the volume or space occupied by the inductive component is thereby increased.

In the drawings, the three forms of the invention shown have been illustrated in such fashion as to indicate that the winding or windings may be subject to three conditions, namely, to be in a condition underfilling the channel (FIG. 4), in a condition just filling the channel (FIG. 6) or in an overfilled condition (FIG. 2). In the two cases shown where the winding just fills or overfills the channel, the lines of flux all will pass between the pole pieces widthwise but externally of the groove system whereas in the condition shown in FIG. 4, dependent upon the degree to which the channel is underfilled, more or less of the flux lines will pass widthwise but directly across tion which may be achieved by reducing the area $A_2$, reference is had to the following table:

TABLE II

| I | | | II | | | III | | |
|---|---|---|---|---|---|---|---|---|
| Initial Readings | | | Filed to read-65 μh | | | .003″ more filed off | | |
| L | Q | Thickness | L | Q | Thickness | L | Q | Thickness |
| 69.9 | 54 | .0505 | 64 | 52 | .047 | 56 | 49 | .044 |
| 69.9 | 45 | .053 | 64 | 45 | .046 | 53 | 45 | .043 |
| 68.5 | 56 | .053 | 65 | 55 | .051 | 52 | 47 | .048 |
| 69 | 44 | .051 | 65 | 45 | .046 | 50 | 40 | .043 |
| 69 | 55 | .052 | 65 | 45 | .050 | 55 | 56 | .047 |
| AVERAGE | | | | | | | | |
| 69.3 | 50.8 | .0519 | 64.6 | 48.4 | .048 | 53.2 | 47.4 | .045 |

The unique configuration of this invention rates very high on the three major features required to achieve high performance characteristics in miniaturized inductance devices. These are:

(1) Low value of total reluctance ($R_t$) in the magnetic circuit.—This corresponds to a high value of effective permeability. Expressed another way, this provides a high value of inductance for any given number of turns in the coil winding. The more costly toroidal construction and other equivalent low air gap configurations (i.e., cup cores, bobbins, sleeve, etc.) have customarily been used to obtain high effective permeability.

This level of $R_t$ is an important criteria in obtaining high Q coils because it determines the number of winding turns ($n$). Assuming a given wire size or winding space is available, the larger $n$, the larger the resistance value ($R_{A.C.}$). This affects the Q value as follows:

$$R_{A.C.}/2\pi fL=Q$$

Figure 10:
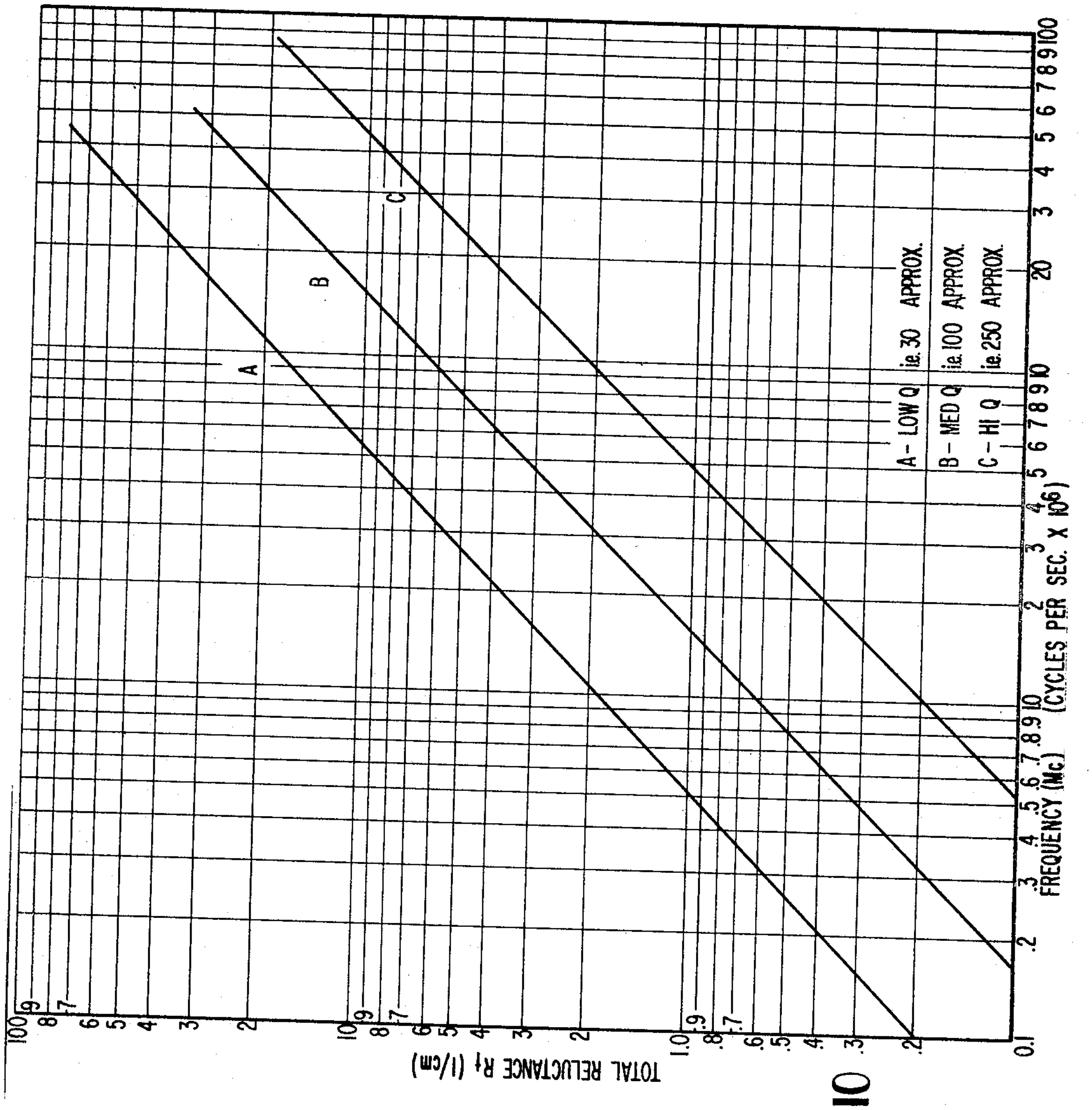
FIG. 10 is a graph showing the relationship of total reluctance to frequency for typical Q values.

In practice, a low value of $R_t$ is one important prerequisite for a high Q value. This value of $R_t$ required for a coil design varies with both the frequency and Q desired. FIG. 10 is based on representative data obtained empirically which outlines requirements for $R_t$ according to Q value and frequency.

(2) Low value of magnetic flux density (B) in the magnetic core material.—A low level of B is a necessary prerequisite for low core losses. This is a very important factor in obtaining a high Q value or high coil efficiency. The drop in Q value, due to core losses, is compounded at the higher value of B, since the core losses are proportional to $B^2$. Optimum Q value cannot be obtained at levels of B much above a few gauss (1–5) without air gaps, or above 10–20 gauss with large air gaps (i.e., $R_a/R_t \geqq .8$).

Optimum values of Q will differ for different size coils, materials of construction, and other factors, but a typical range for miniaturized coils will normally fall in the range of 30 to 150.

These levels are frequently impossible to achieve with miniature toroidal coils, but they are obtainable with the present invention (see Table I). Operation of ferrite material much above 250 gauss introduces instability of inductance values due to core saturation effects. For powdered iron materials, this limit is approximately 750 gauss.

(3) Provide a high effective permeability while maintaining a high percentage of total reluctance ($R_t$) in the reluctance of the air gap ($R_a$).—This is impossible to achieve with toroids. In contrast, it is very feasible with the present invention as indicated in Table I. The percentage $R_a/R_t$ is the measure of the stabilizing effect of the air gap on the electrical characteristic of the inductor. The instability of permeability with temperature and core saturation effects, which is inherent in the basic materials, is not reflected directly as inductor instability, but rather, is reduced by the ratio of percentage $R_a/R_t$. There is also a corresponding improvement in the Q value of the inductor as it relates to core losses, which is attributed to the value of $R_a/R_t$.

What is claimed is:

1. A miniaturized inductive component comprising, in combination, a single piece core consisting of a body of paramagnetic material having a maximum cross-sectional area A and displacing a volume not greater than about 0.50 cc. and having a pair of flange pieces disposed in substantially parallel spaced relation and a spool portion between said flange pieces having a predetermined cross-sectional area $Am$, said flange pieces and said spool portion defining a groove defining lengthwise along said flange pieces, a winding received in said groove and disposed in encompassing relation to said spool portion so that all of the lines of flux of a magnetic field induced in said body by said winding pass normal to $Am$ and through air between said flange pieces, said groove being of a total length which is at least about 10 times its width, the ratio $Am/A$ being at least about 0.2, the length of the magnetic path in the body and in air providing a total reluctance $R_t$ such that Q=30–250 where $R(A.C.)/2\pi fL=Q$ and $R_t/f=0.2$–$2.0$, and that component $R_a$ of the total reluctance $R_t$ due to the air gap being at least as large as .2 $R_t$.

2. The inductive component as defined in claim 1 wherein said body is rectangular and said groove is discontinuous, consisting of a pair of parallel groove portions.

3. The inductive component as defined in claim 2 wherein said groove portions lie in a common face of said body.

4. The inductive component as defined in claim 2 wherein said groove portions lie in opposite faces of said body.

5. The inductive component as defined in claim 1 wherein said body is cylindrical and said groove is continuous, extending circumferentially around said body.

6. The inductive component as defined in claim 1 wherein one of said flange pieces is provided with a depression on its outer face opposite said spool portion for reducing the total inductance of said component.

References Cited

UNITED STATES PATENTS

| | | | |
|---|---|---|---|
| 448,644 | 3/1891 | Farmer | 336—83 XR |
| 523,805 | 7/1894 | Cabot | 336—83 |
| 1,641,473 | 9/1927 | Chylinski | 336—83 XR |
| 2,064,771 | 12/1936 | Vogt | 336—233 XR |
| 3,020,527 | 2/1962 | MacLaren | 336—221 XR |

THOMAS J. KOZMA, Primary Examiner

U.S. Cl. X.R.

336—221, 233

UNITED STATES PATENT OFFICE
CERTIFICATE OF CORRECTION

Patent No. 3,493,909 February 3, 1970

John P. Beverly

It is certified that error appears in the above identified patent and that said Letters Patent are hereby corrected as shown below:

Column 4, line 71, "must" should read -- much --. Column 6, line 17, "objects" should read -- objectives --. Columns 5 and 6 TABLE I, subheadings to the fifth and sixth columns, "O=100" and "O=50" should read -- Q=100 -- and -- Q=50 --; same table, seventh column, line 4 thereof, "95.9" should read -- 95.6 --; same table second column, line 13 thereof, "50" should read -- 10 --. Column 8, lines 19, 25 and 28, "inductance", each occurrence, should read -- inductive --. Column 9, line 18, "inductance" should read -- inductive --. Column 10, lines 26 and 27, "defining" should read -- extending --.

Signed and sealed this 24th day of November 1970.

(SEAL)

Attest:

Edward M. Fletcher, Jr.
Attesting Officer

WILLIAM E. SCHUYLER, JR.
Commissioner of Patents